US005107353A

United States Patent [19]

Okumura

[11] Patent Number: 5,107,353

[45] Date of Patent: Apr. 21, 1992

[54] DRIVING METHOD OF LIQUID CRYSTAL DISPLAY

[75] Inventor: Haruhiko Okumura, Kanagawa, Japan

[73] Assignee: Kabushiki Kaisha Toshiba, Kawasaki, Japan

[21] Appl. No.: 572,556

[22] Filed: Aug. 27, 1990

[30] Foreign Application Priority Data

Aug. 28, 1989 [JP] Japan .................................. 1-218546

[51] Int. Cl.[5] ............................................. G02F 1/13

[52] U.S. Cl. ....................................... 359/55; 340/784

[58] Field of Search ............................ 350/333, 359 F; 340/784; 359/54, 55, 66

[56] References Cited

U.S. PATENT DOCUMENTS

| | | | |
|---|---|---|---|
| 4,413,256 | 11/1983 | Yasuda et al. | 340/784 |
| 4,600,274 | 7/1986 | Morozumi | 350/339 F |
| 4,808,991 | 2/1989 | Tachiuchi et al. | 340/784 X |
| 4,908,609 | 3/1990 | Stroomer | 340/784 X |
| 4,943,802 | 7/1990 | Kuijk | 340/784 |
| 4,950,058 | 8/1990 | Diem et al. | 350/333 |
| 4,955,697 | 9/1990 | Tsukada et al. | 350/333 X |

FOREIGN PATENT DOCUMENTS

| | | | |
|---|---|---|---|
| 0158366 | 10/1985 | European Pat. Off. . | |
| 60-151615 | 8/1985 | Japan | 350/333 |
| 60-156095 | 8/1985 | Japan | 350/333 |
| 0257056 | 8/1987 | World Int. Prop. O. . | |

*Primary Examiner*—Stanley D. Miller
*Assistant Examiner*—Huy K. Mai
*Attorney, Agent, or Firm*—Foley & Lardner

[57] ABSTRACT

A liquid crystal display has a plurality of display pixels arranged in a matrix and a plurality of signal and scan lines orthogonally crossing one another and connected to the display pixels. Each of the display pixels includes a liquid crystal dot, a switching element and a color filter to which at least one of color signals R, G and B is supplied. A method of driving the liquid crystal display comprises the step of inverting polarities of the signal lines for every scan in line-sequentially scanning the display pixels, and shifting the phase of polarity inversion of each of the signal lines to which the color signals R, G and B are supplied.

5 Claims, 12 Drawing Sheets

ℓx: HORIZONTAL PIXEL PITCH
ℓy: VERTICAL PIXEL PITCH

FIELD INVERTING METHOD

SCAN INVERTING METHOD

SIGNAL LINE INVERTING METHOD

ℓx: VERTICAL PIXEL PITCH
ℓy: HORIZONTAL PIXEL PITCH

: POLARITY ⊕
: POLARITY ⊖

SCAN INVERTING METHOD (PRIOR ART)

SIGNAL LINE INVERTING METHOD

DELTA INVERTING METHOD

ℓx: VERTICAL PIXEL PITCH
ℓy: HORIZONTAL PIXEL PITCH

DELTA INVERTING METHOD

DRIVING METHOD OF LIQUID CRYSTAL DISPLAY

BACKGROUND OF THE INVENTION

1. Field of the Invention

The present invention relates to a method of driving a liquid crystal display, and particularly to a method of driving, in a flickerless manner, a liquid crystal display employing liquid crystal dots arranged in a matrix.

2. Description of the Prior Art

As is known, a liquid crystal display (LCD) has advantages such as low power consumption and portability. The LCDs are widely used, therefore, for portable calculators and watches to display characters. With development of office automation, i.e., automation of business machines, high performance LCDs are required to realize highly integrated business machines. To meet the requirement, a thin film transistor liquid crystal display (TFTLCD) employing thin film transistors (TFTs) as switching elements of pixels has been developed and produced.

FIG. 1 shows a conventional TFTLCD. The TFTLCD comprises pixels Pll to Pnm arranged in a matrix. The pixels are connected to signal lines Xl to Xm and scan lines Yl to Yn. A signal electrode driving circuit 1 and a scan electrode driving circuit 2 turn on the pixel Pnm and provide a display signal to the pixel.

FIG. 2 is an equivalent circuit of one of the pixels of the TFTLCD. The circuit comprises a liquid crystal dot 3*nm* and a switching element 4*nm*, i.e., the TFT. This TFT is usually made of amorphous silicon, polysilicon, silicon surfer, etc.

To drive the TFTLCD of FIGS. 1 and 2, the scan electrode driving circuit 2 provides a scan pulse through the scan line Yn to the liquid crystal dot 3*nm*. According to a display pattern, the signal electrode driving circuit 1 provides a signal voltage through the signal line Xm. The pulse through the scan line Yn turns on the TFT 4*nm*, and the signal voltage charges a capacitor 5*nm*. After the TFT 4*nm* is turned off, the capacitor 5*nm* holds the charged voltage until the TFT 4*nm* is again turned on. The voltage held in the capacitor 5*nm* is applied to the liquid crystal dot 3*nm* to display a dot.

FIG. 3 is an equivalent circuit of the TFTLCD of FIG. 1. In FIG. 3, the TFTLCD comprises signal lines Xl to Xm; scan lines Yl to Yn; TFTs 4*ll* to 4*nm* disposed at intersections of the signal and scan lines; capacitors 5*ll* to 5*nm* connected to the TFTs, respectively; liquid crystal dots 3*ll* to 3*nm* connected to the TFTs, respectively; and a common potential 6 to which one ends of the capacitors and liquid crystal dots are connected.

An operation of the TFTLCD of FIG. 3 will be explained with reference to FIGS. 4*a* to 4*c*.

The signal electrode driving circuit 1 applies a voltage signal Vsm having time/voltage characteristics of FIG. 4*a* to the signal line X (Xl, . . . , Xm). The scan electrode driving circuit 2 applies a gate voltage Vgn of FIG. 4*b* to the scan line Y (Yl, . . . , Yn). As a result, a drain voltage VD of FIG. 4*c* for a selected field is applied to a liquid crystal dot disposed at an intersection of the lines X and Y. At this time, an "ON current" Io is expressed as follows:

$$Io = Cox \cdot \mu (W/L)(VD - VsN)\{Vgn - Vth - (VD + Vsm)/2\} \quad (1)$$

where

Cox = gate insulation film capacity $\mu$ = mobility

Vth = threshold voltage

W = TFT channel width

L = channel length

As is apparent from the equation (1), the "ON current" is insufficient when the voltage Vsm is positive, so that a waveform of the driving voltage VD may be asymmetrical on positive and negative sides as shown in FIG. 4*c*. This may cause flickers.

Each liquid crystal dot 3*nm* reacts to an effective value of the driving voltage, which varies for each field across a voltage level Vcom. Accordingly, the transmission, i.e., intensity of each liquid crystal dot differs for each field, thereby causing the flickers.

As is understood from FIG. 2, when the gate voltage Vgn is turned off, the voltage VD leaks to the liquid crystal dot through a parasitic capacitance Cgd between the gate and drain and decreases by ΔVp, which is expressed as follows:

$$\Delta Vp = \frac{Cgd \cdot Vg}{Cds + Cs + CLc + Cgd + Cpd} \quad (2)$$

where

Cds = capacitance between signal line and drain

Cs = storage capacitance

CLc = liquid crystal dot capacitance

Cgd = capacitance between gate and drain

Cpd = capacitance between adjacent signal line and liquid crystal dot

This voltage change ΔVp appears for every field to cause the flickers.

In addition to the above two factors, there is another factor that causes the flickers, i.e., an "OFF current" of the TFT. The "OFF current" changes in response to a gate/source voltage Vgs of the TFT to produce a difference ($\Delta V^{+}off - \Delta V^{-}off$) between the positive and negative sides of the pixel voltage VD, thereby causing the flickers.

Consequently, there are the following three factors that cause the flickers:

(1) Insufficient TFT "ON current"

(2) Leakage of gate voltage due to gate/drain capacitance of TFT (3) TFT "OFF" current.

As explained above, due to the insufficient characteristics of the switching element (TFT), an effective voltage applied to each pixel differs depending on the positiveness and negativeness of a driving voltage, so that, when a normal field inverting operation is carried out, plane flickers of 30 Hz may occur.

To reduce the plane flickers, a method of driving a liquid crystal display by inverting the polarity of a driving voltage within a frame has been proposed. This method converts the plane flickers into line flickers or into very small plane flickers such as pixel flickers, thereby reducing visible flickers.

FIGS. 5*a* to 5*c* show conventional flickerless driving techniques disclosed in Japanese Laid-Open Patent No. 60-156095 which inverts the polarity of a signal line, Japanese Laid-Open Patent No. 60-3698 which inverts the polarities of signal and scan lines, and Japanese Laid-Open Patent No. 60-151615 which inverts polarities for each scan.

FIG. 5*a* shows the field inverting technique in which polarities are inverted for each field.

FIG. 5*b* shows the scan inverting technique in which polarities are inverted for each scan. The inversion is carried out not only for every frame but also within a frame, thereby alternately driving each pixel.

FIG. 5*c* shows the column inverting technique in which the polarities of signal lines (FIG. 3) are alternately inverted. Similar to the line inverting technique, the polarities are inverted between frames to convert the plane flickers into column flickers.

It has been confirmed experimentally that the inframe inverting technique such as those of FIGS. 5*b* and 5*c* can theoretically and practically reduce the plane flickers of each frame less than a visible level by balancing intensity of each frame.

The conventional techniques of FIGS. 5*a* to 5*c* produce, however, visible horizontal and vertical stripes. This will be explained.

The driving technique of FIG. 5*a* inverts polarities field by field, so that the technique is not effective in reducing the plane flickers.

The driving method of FIG. 5*b* inverts polarities for every scan, so that the technique is effective in reducing the plane flickers but produces visible horizontal stripes corresponding to scan lines. Particularly when a motion shot by moving a camera, i.e., a so-called pan is displayed on a screen and when the eyes of an observer follow the motion on the screen, the horizontal stripes are especially visible. A speed of the eyes in a vertical direction on the screen is expressed as follows:

$$Ve=(2n-1)ly/Tf$$

where
ly=vertical pixel pitch
n=0, 1, 2, . . .
Tf=field period
If the speed of the eyes coincides with a movement of a horizontal stripe caused by the inverting operation in a frame, the horizontal stripe is seen as if it is stopped. Consequently, the horizontal stripe is clearly seen on the screen. This is not preferable.

The driving method of FIG. 5*c* inverts the polarity of each signal line, so that the technique is effective in reducing the plane flickers but produces visible vertical stripes. This is because a color signal G among color signals R, G and B is most perceivable. As shown in FIG. 5*c*, therefore, a vertical stripe of color G is formed. Similar to the case of FIG. 5*b*, when the eyes of an observer move horizontally to follow a motion on a screen, the vertical stripe may particularly be visible.

Conditions that make the vertical and horizontal stripes more visible will be considered.

FIGS. 6*a* and 6*b* show experimental results of visibility/discrimination threshold characteristics with respect to a moving line. As is apparent in the figures, a high-speed motion provides low band-pass spatial frequency characteristics, and a low-speed motion provides band-pass characteristics having maximum sensitivity at 3 cycle/deg. The maximum sensitivity of a slightly moving motion is higher than that of a stopped motion. In any case, a contrast and spatial frequency determine a visible range, and the conventional flickerless driving techniques operating on the present TFT characteristics produce visible vertical and horizontal stripes.

SUMMARY OF THE INVENTION

An object of the present invention is to provide a method of driving a liquid crystal display that can provide high-quality images with no flickers and reduced vertical and horizontal stripes by line-sequentially scanning liquid crystal pixels.

In order to accomplish the object, according to a first aspect of the present invention, each display pixel comprises a liquid crystal dot, a switching element, a color filter to which a color signal R, G, or B is supplied. A plurality of the pixels are arranged in a matrix to form a liquid crystal display. The display pixels arranged in rows and columns are connected to a plurality of signal lines and scan lines that are orthogonal to one another. In line-sequentially scanning the display pixels, polarities of the signal voltage are inverted for each scan. In addition, in scanning the signal lines to which the color signals R, G and B are provided, phases of the inverted polarities are shifted.

According to a second aspect of the present invention, each display pixel comprises a liquid crystal dot, a switching element, and a color filter to which a color signal R, G, or B is supplied. The color filters for the signals R, G and B in one row are shifted by ½ pitches from those in an adjacent row. A plurality of the pixels are arranged in a matrix. The display pixels arranged in rows and columns are connected to a plurality of signal lines and scan lines that orthogonally cross one another, thereby forming a liquid crystal display. In line-sequentially scanning the display pixels, the phase and cycle of polarity inversion is changed for each signal line to which the color signal R, G, or B is supplied.

As described above, according to the first aspect of the present invention, polarities of signal lines are inverted for each scan in line-sequentially scanning display pixels. Supposing transmittance of the display pixels R, G and B for positive and negative polarities are $R^+$, $G^+$, $B^+$, $R^-$, $G^-$ and $B^-$, intensities $I^+$ and $I^-$ will be expressed as follows:

$$I^+=0.59G^++0.3R^++0.11B^+$$

$$I^-=0.59G^-+0.3R^-+0.11B^-$$

When driving phases of the display pixels R, G and B are shifted, an amount FR of flickers is expressed as follows:

$$FR=\left|\frac{0.59(G^+-G^-)+0.3(R^--R^+)+0.11(B^+-B^-)}{0.59(G^+-G^-)+0.3(R^--R^+)+0.11(B^+-B^-)}\right|$$

When phases of the display pixels G and B are shifted, flicker amounts FG and FB are expressed as follows:

$$FG=\left|\frac{0.59(G^--G^+)+0.3(R^+-R^-)+0.11(B^+-B^-)}{0.59(G^++G^-)+0.3(R^++R^-)+0.11(B^++B^-)}\right|$$

$$FB=\left|\frac{0.59(G^+-G^-)+0.3(R^+-R^-)+0.11(B^+-B^-)}{0.59(G^++G^-)+0.3(R^++R^-)+0.11(B^++B^-)}\right|$$

Here, if $G^+=R^+=B^+=T^+$, $G^-=R^-=B^-=T^-$, and $T^-=T^++T$, the following is established:

$$F=\frac{\Delta T}{2T^++\Delta T}$$

$$FR=\frac{0.4\Delta T}{2T^++\Delta T}=0.4F$$

-continued $$FG = \frac{0.18\Delta T}{2T^{+} + \Delta T} = 0.18F$$

$$FB = \frac{0.78\Delta T}{2T^{+} + \Delta T} = 0.78F$$

From the above, ΔT−F with $T^{+}=1$ will be as shown in FIG. 8. It is understood from the figure that an effective driving method is to reverse the polarity of one of the color signals R, G and B from that of the remaining two.

The second aspect of the present invention inverts polarities of signal lines for each scan. In addition, the second aspect arranges each group of three color filters R, G and B in a delta, and changes the phases of polarity inversion of color signals to the color filters for respective signal lines. As a result, an intensity change may occur delta by delta in a frame. This is a so-called delta inversion driving method. According to this method, vertical stripes are nested to be not visible.

These and other objects, features and advantages of the present invention will be more apparent from the following detailed description of preferred embodiments in conjunction with the accompanying drawings.

DETAILED DESCRIPTION OF THE EMBODIMENTS

A liquid crystal display (LCD) according to the embodiment of the present invention will be explained with reference to the drawings.

Figure 1:
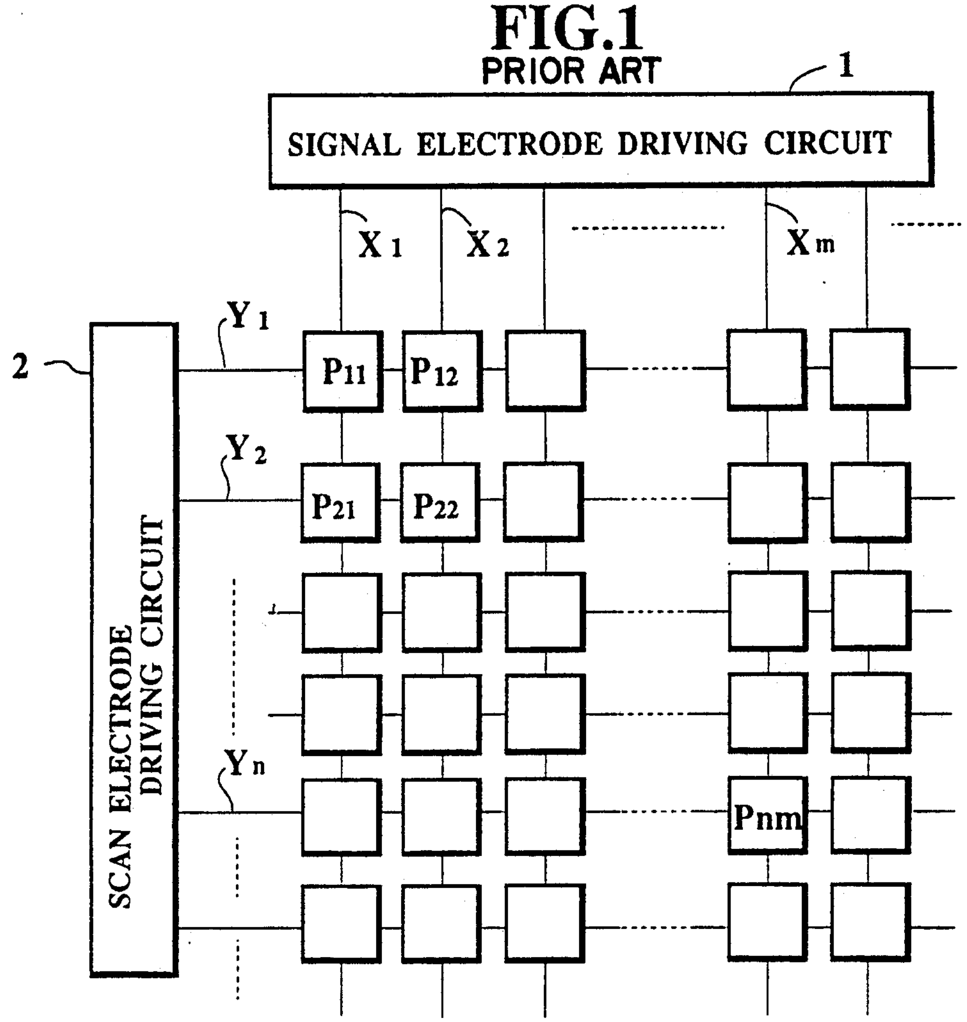
FIG.1 PRIOR ART
FIG. 1 is a circuit diagram schematically showing a conventional TFTLCD.
Figure 2:
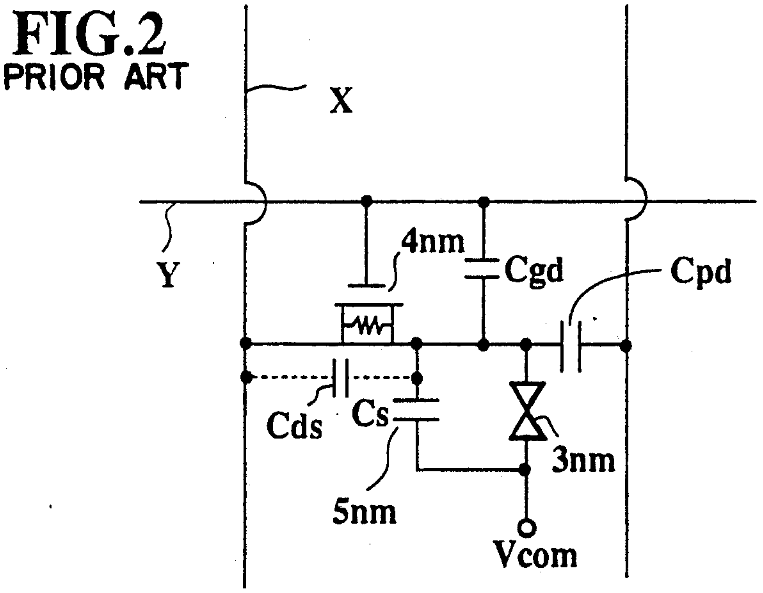
FIG.2 PRIOR ART
FIG. 2 is an equivalent circuit diagram showing one pixel of the TFTLCD of FIG. 1.
Figure 3:
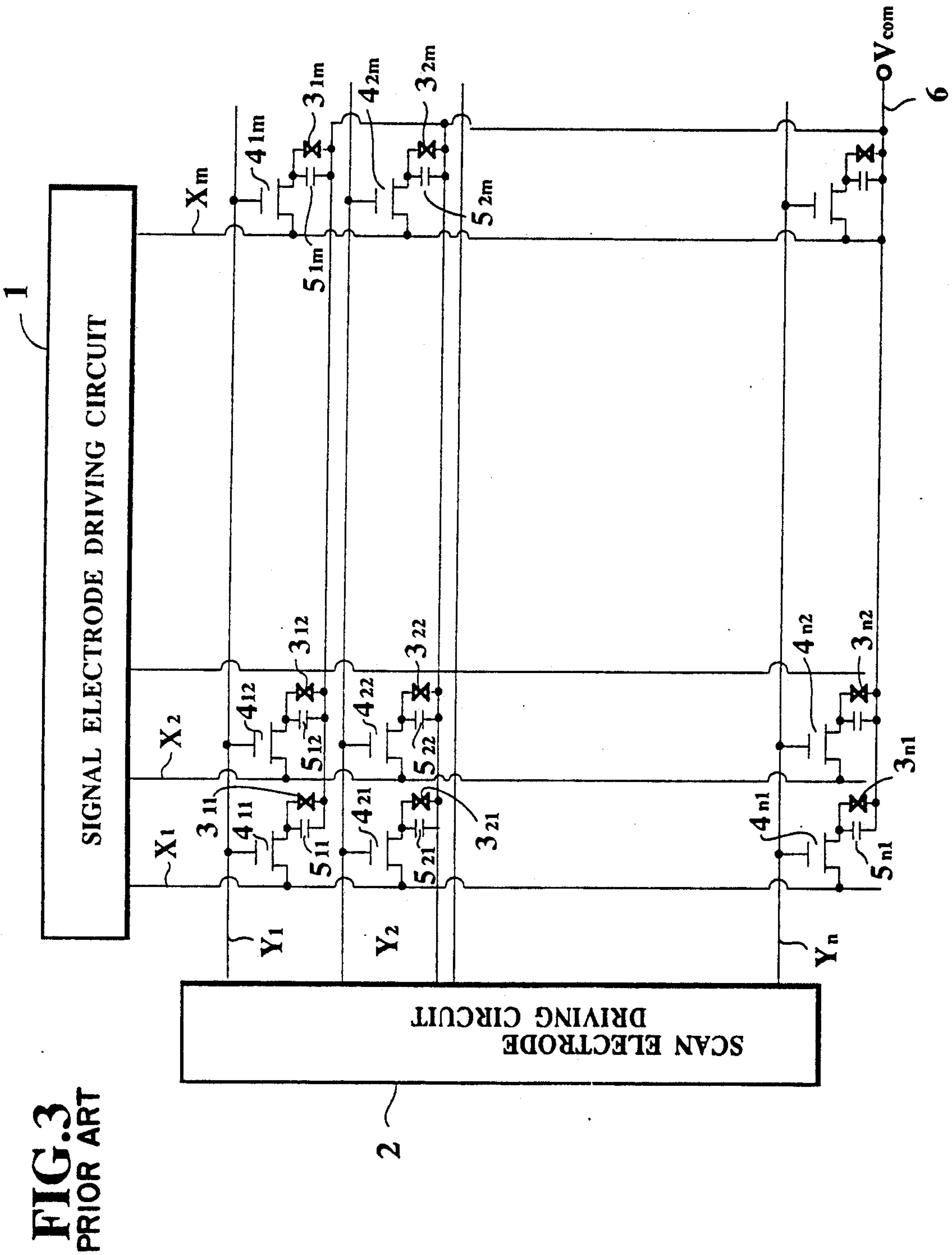
FIG.3 PRIOR ART
FIG. 3 is an equivalent circuit diagram of the TFTLCD of FIG. 1.
Figure 4A:
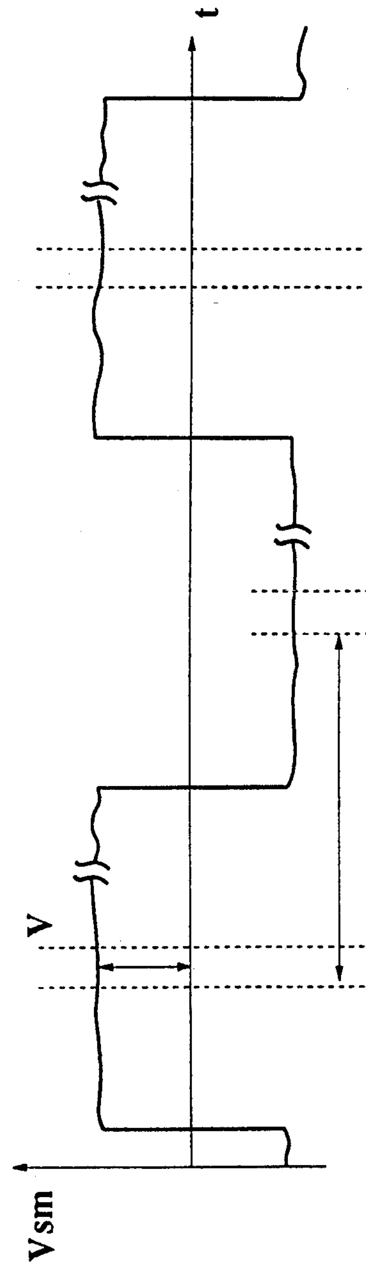
FIG.4a PRIOR ART
FIG. 4*a* to 4*c* are waveforms showing driving and pixel voltages according to a conventional LCD driving method.
Figure 4B:
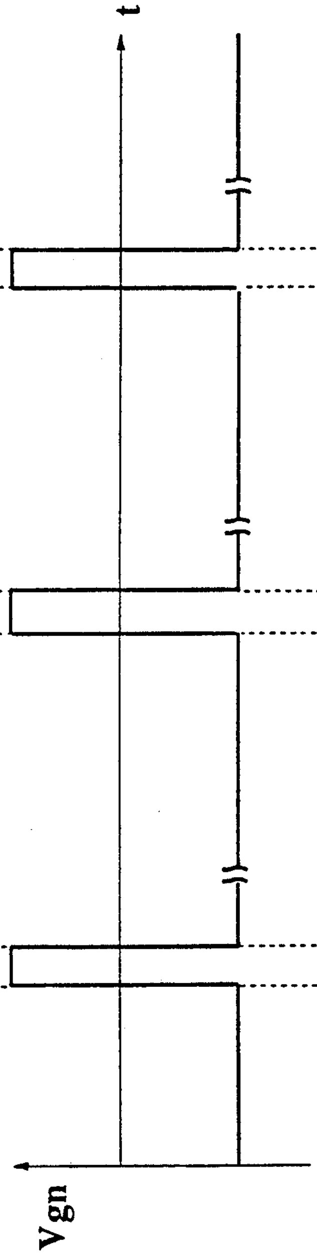
FIG.4b PRIOR ART
Figure 4C:
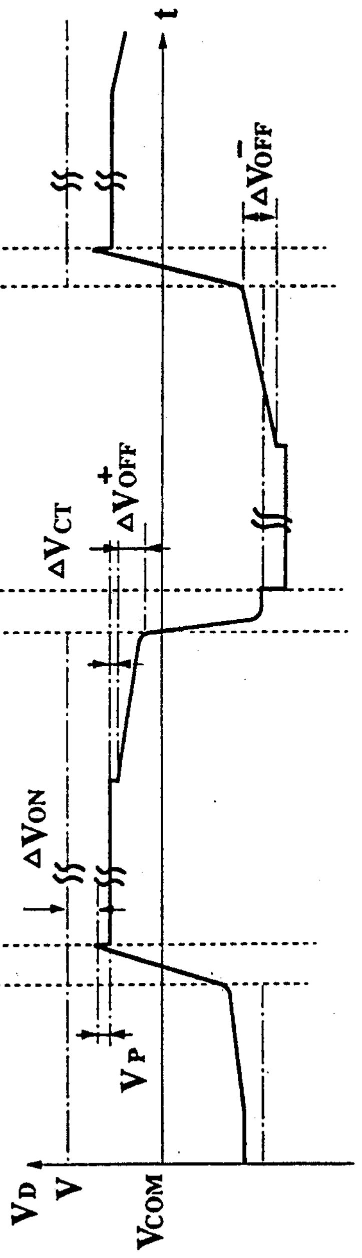
FIG.4c PRIOR ART
Figure 5A:
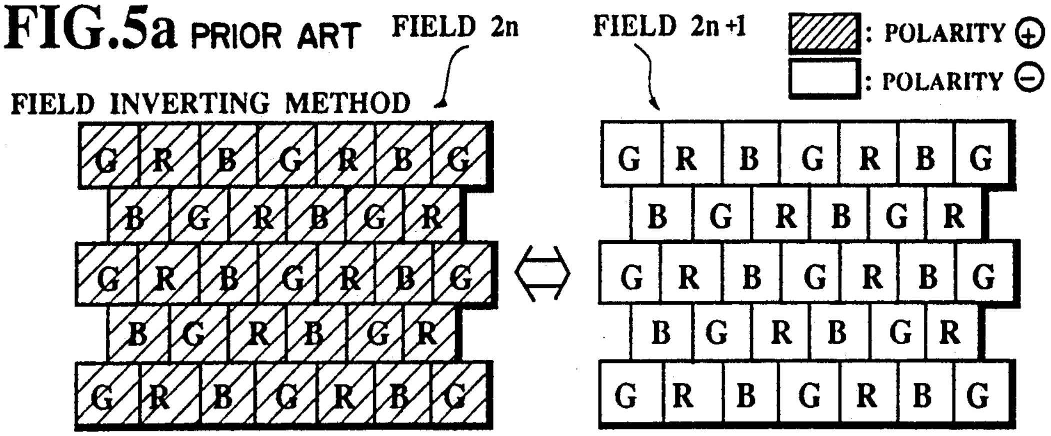
FIG.5a PRIOR ART
FIGS. 5*a* to 5*c* are explanatory views showing conventional LCD driving methods.
Figure 5B:
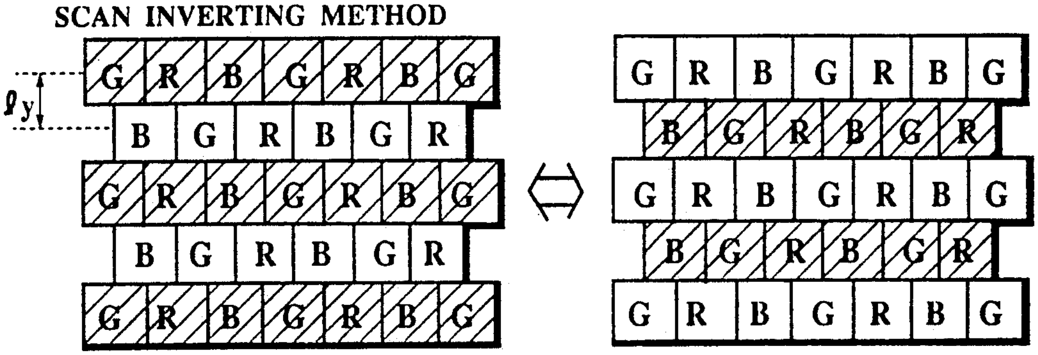
FIG.5Bb PRIOR ART
Figure 5C:
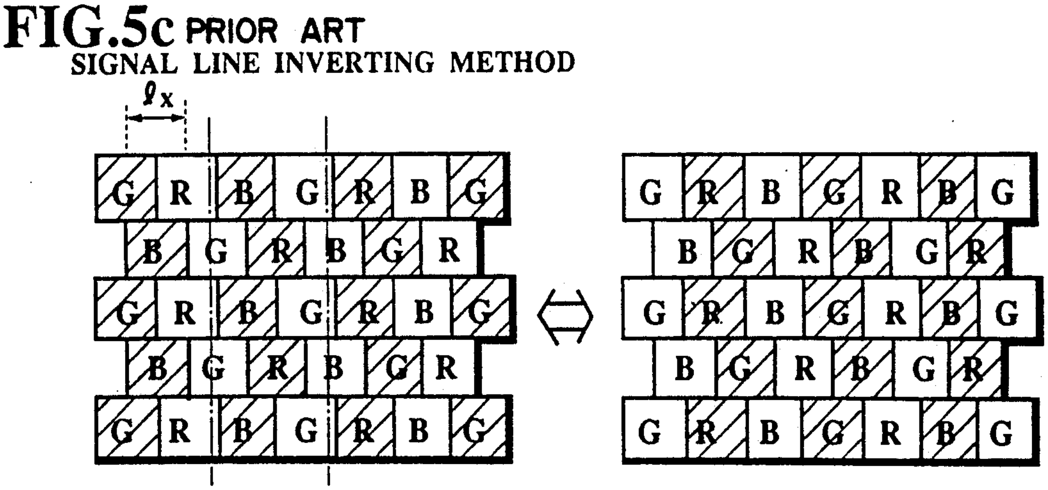
FIG.5c PRIOR ART
Figure 6B:
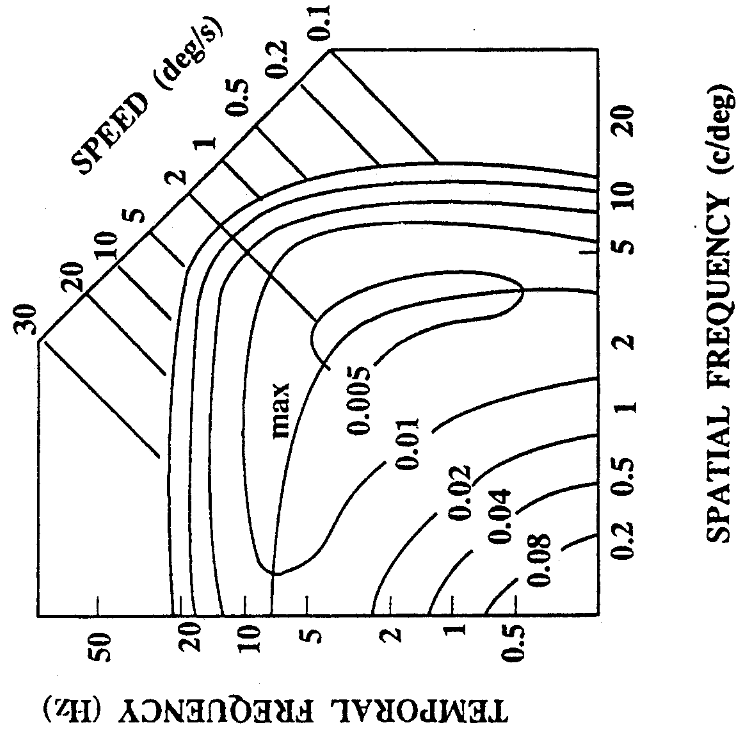
FIGS. 6*a* and 6*b* are visibility discrimination threshold characteristics explaining the visibility of vertical and horizontal stripes.
Figure 6A:
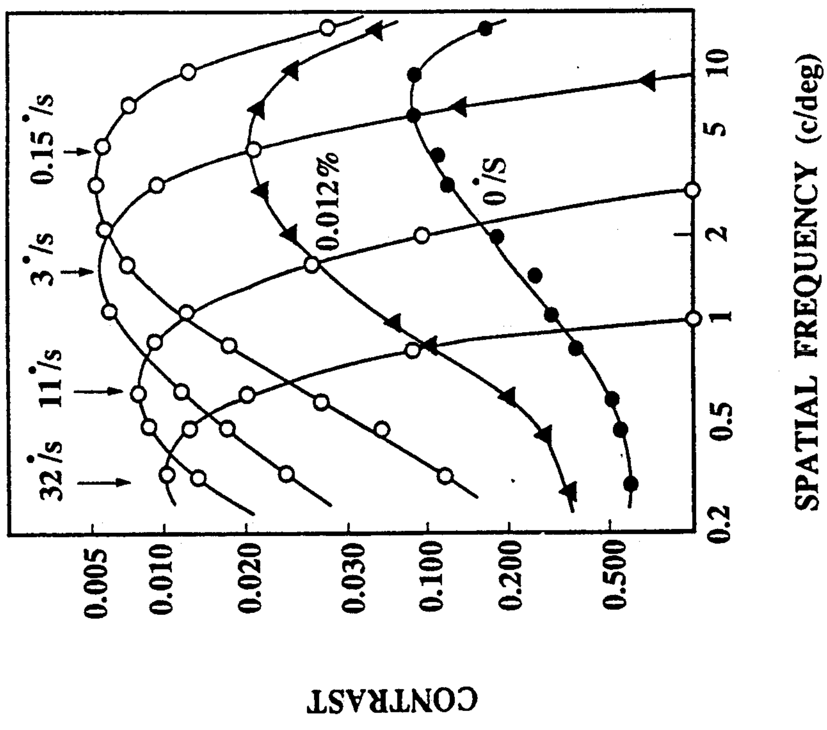
Figure 7:
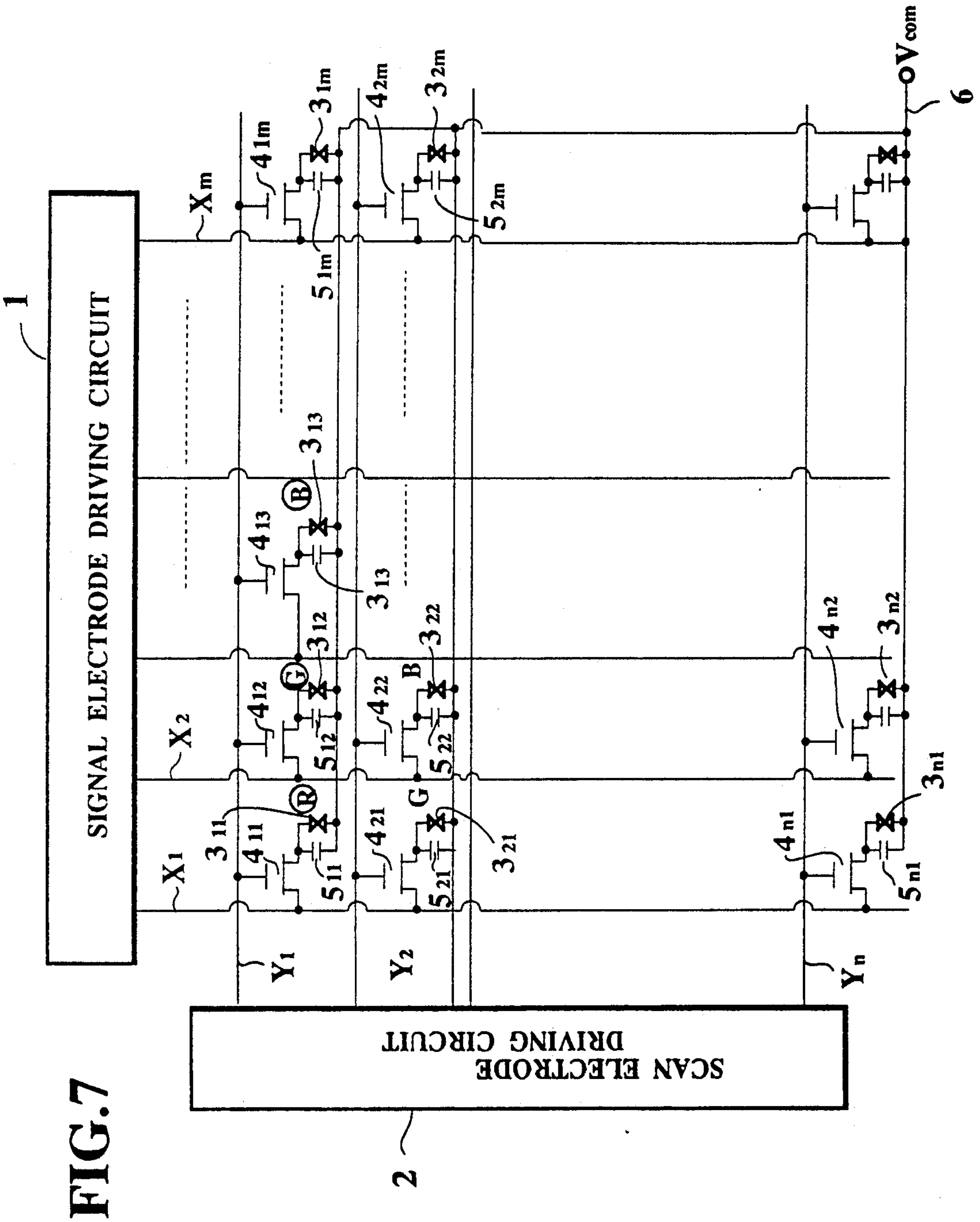
FIG. 7 is a plan view showing the essential part of an LCD that is driven by a driving method according to a first embodiment of the present invention.

In FIG. 7, the LCD comprises signal lines Xl to Xm, scan lines Yl to Yn, thin film transistors (TFTs) 4*ll* to 4*nm* connected to intersections of the signal and scan lines, capacitors 5*ll* to 5*nm* connected to the TFTs, respectively, liquid crystal dots 3*ll* to 3*nm* connected to the TFTs, respectively, color filters G, R and B disposed for the liquid crystal dots, and a common potential 6 to which one ends of the liquid crystal dots 3*ll* to 3*nm* and capacitors 5*ll* to 5*nm* are connected.

A signal electrode driving circuit 1 provides signal voltage pulses through the signal lines Xl to Xm to the TFTLCD, and a scan electrode driving circuit 2 provides scan signal pulses through the scan lines Yl to Yn to the TFTs 4*ll* to 4*nm*. Due to the positively and negatively changing polarity of a signal voltage applied to each liquid crystal dot, flickers occur.

Supposing the transmission of the color pixels R, G and B for positive and negative polarities are $R^{+}$, $G^{+}$, $B^{+}$, $R^{-}$, $G^{-}$ and $B^{-}$, intensities $I^{+}$ and $I^{-}$ are expressed as follows:

$$I^{+}=0.59G^{+}+0.3R^{+}+0.11B^{+}$$

$$I^{-}=0.59G^{-}+0.3R^{-}+0.11B^{-}$$

Here, an amount F of the flicker is defined as follows:

$$F = \frac{\Delta I}{I} = \frac{1/2(I^{+} - I^{-})}{1/2(I^{+} + I^{-})} = \frac{I^{+} - I^{-}}{I^{+} + I^{-}}$$

In a normal field-inverting operation, the F is defined as follows:

$$F = \left| \frac{0.59(G^{+} - G^{-}) + 0.3(R^{+} - R^{-}) + 0.11(B^{+} - B^{-})}{0.59(G^{+} + G^{-}) + 0.3(R^{+} + R^{-}) + 0.11(B^{+} + B^{-})} \right|$$

Supposing $G^{-}>G^{+}$, $R^{-}>R^{+}$, $B^{-}>B^{+}$, the above equation tells that the flicker occurs strongly because the transmission of the each color pixel changes in phase.

Figure 9:
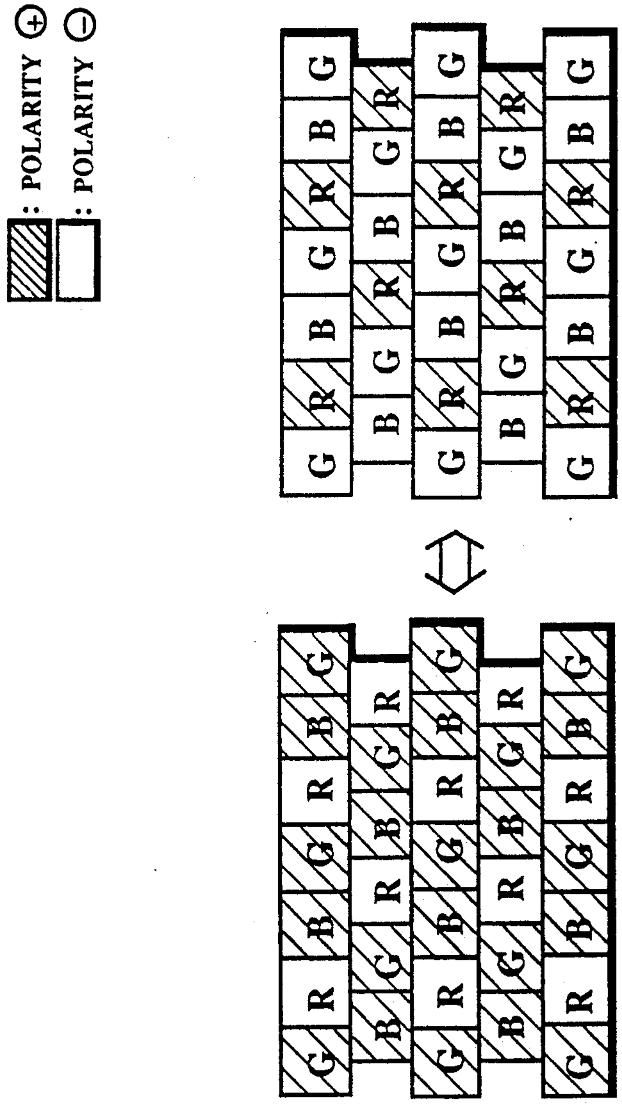
FIG. 9 is an explanatory view showing the LCD driving method according to the first embodiment of the present invention.

To reduce the flicker, phases of the color signal voltages R, G and B may be shifted to drive them from $G^{+}$, $R^{-}$ and $B^{+}$ to $G^{-}$, $R^{+}$ and $B^{-}$ (only R is inverted) as shown in FIG. 9. Amounts of the flicker at this time are expressed as follows:

$$FR = \left| \frac{0.59(G^{+} - G^{-}) + 0.3(R^{-} - R^{+}) + 0.11(B^{+} - B^{-})}{0.59(G^{+} + G^{-}) + 0.3(R^{+} + R^{-}) + 0.11(B^{+} + B^{-})} \right|$$

$$FG = \left| \frac{0.59(G^{-} - G^{+}) + 0.3(R^{+} - R^{-}) + 0.11(B^{+} - B^{-})}{0.59(G^{+} + G^{-}) + 0.3(R^{+} + R^{-}) + 0.11(B^{+} + B^{-})} \right|$$

$$FB = \left| \frac{0.59(G^{+} - G^{-}) + 0.3(R^{+} - R^{-}) + 0.11(B^{+} - B^{-})}{0.59(G^{+} + G^{-}) + 0.3(R^{+} + R^{-}) + 0.11(B^{+} + B^{-})} \right|$$

Here, it is supposed that $G^{+}=R^{+}=B^{+}=T^{+}$, $G^{-}=R^{-}=B^{-}=T^{-}$, and $T^{-}=T^{+}+\Delta T$. Then, the following is established:

$$F = \frac{\Delta T}{2T^{+} + \Delta T}$$

$$FR = \frac{0.4\Delta T}{2T^{+} + \Delta T} = 0.4F$$

$$FG = \frac{0.18\Delta T}{2T^{+} + \Delta T} = 0.18F$$

$$FB = \frac{0.78\Delta T}{2T^{+} + \Delta T} = 0.78F$$

Figure 8:
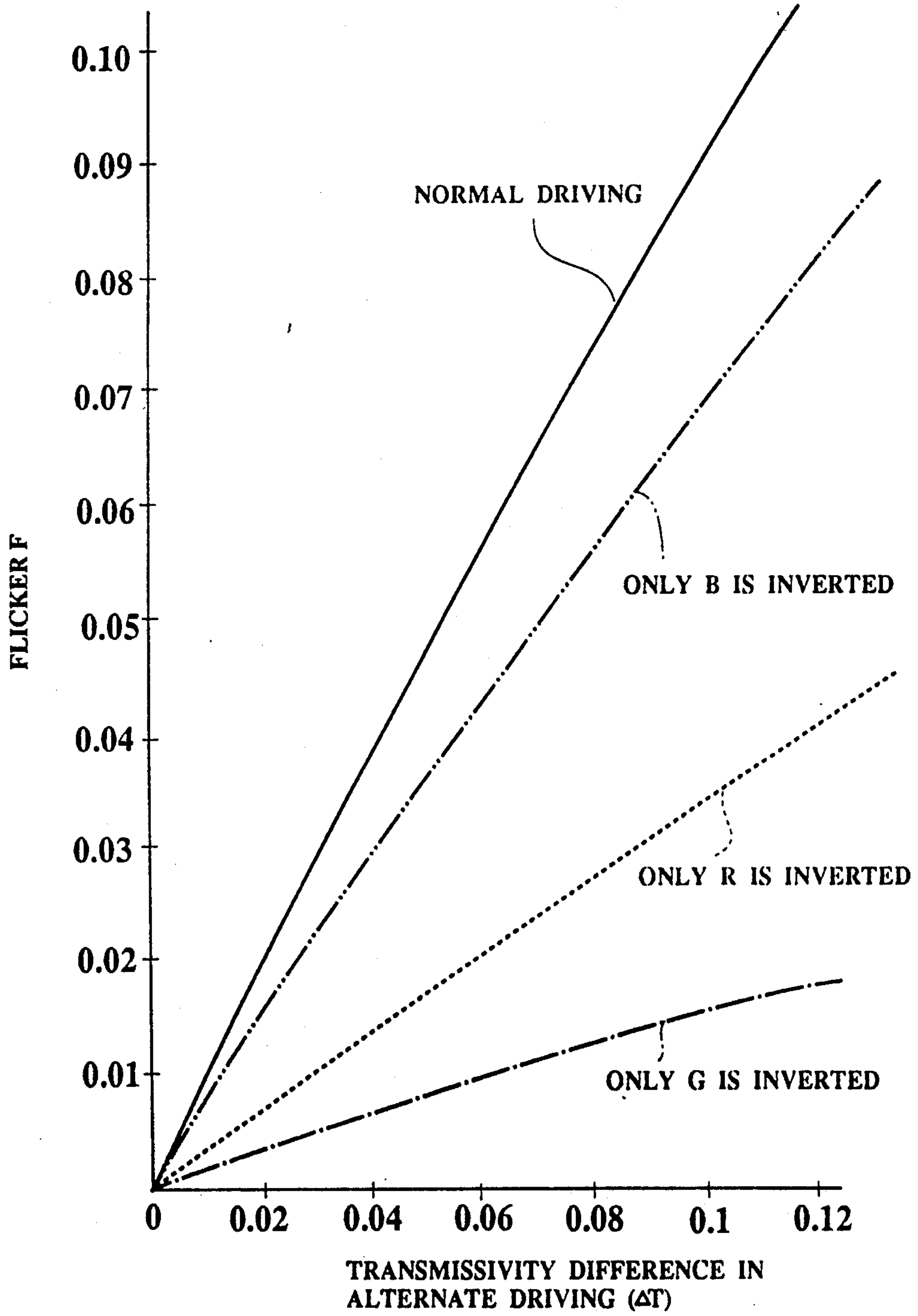
FIG. 8 is a characteristic diagram showing a relation of a transmission difference to an amount of flickers in an alternate driving operation, and showing an effect of the first embodiment of the present invention.

From the above, $\Delta T - F$ with $T^{+} = 1.0$ will be as shown in FIG. 8. It is understood from this figure that changing the polarity of only one color signal among the color signals R, G and B from that of the remaining two is effective. This is effective, however, only for displaying white color. For monochrome displaying, the flickers will not be reduced.

When the signals R, G and B are inverted in a field at the same phase, the flicker may occur but no vertical and horizontal stripes may occur in the frame. If the phases are shifted as explained above, however, colors may change in the frame but the vertical and horizontal stripes may not be visible.

The above embodiment arranges each group of three color filters into a delta. It is also possible to arrange the color filters into a mosaic.

Next, the second embodiment of the present invention will be explained.

As explained before, the conventional flickerless LCD driving techniques produce vertical and horizontal stripes in a frame. Visibility of these stripes deeply relates to their spatial frequencies. This will be examined. In studying the vertical and horizontal stripes on a display screen, the stripes are checked from a position away from the screen by a distance "3H" three times the height "H" of the screen.

For the line inversion driving method, the following is established:

$$\tan 1^{\circ} = \frac{\left(\frac{H}{N_V/2}\right) \times N_{LN}}{3H}$$

$$N_{LN} = \frac{3}{2} N_V \tan 1^{\circ} \ [c/d] \qquad (3-1)$$

Figure 10:
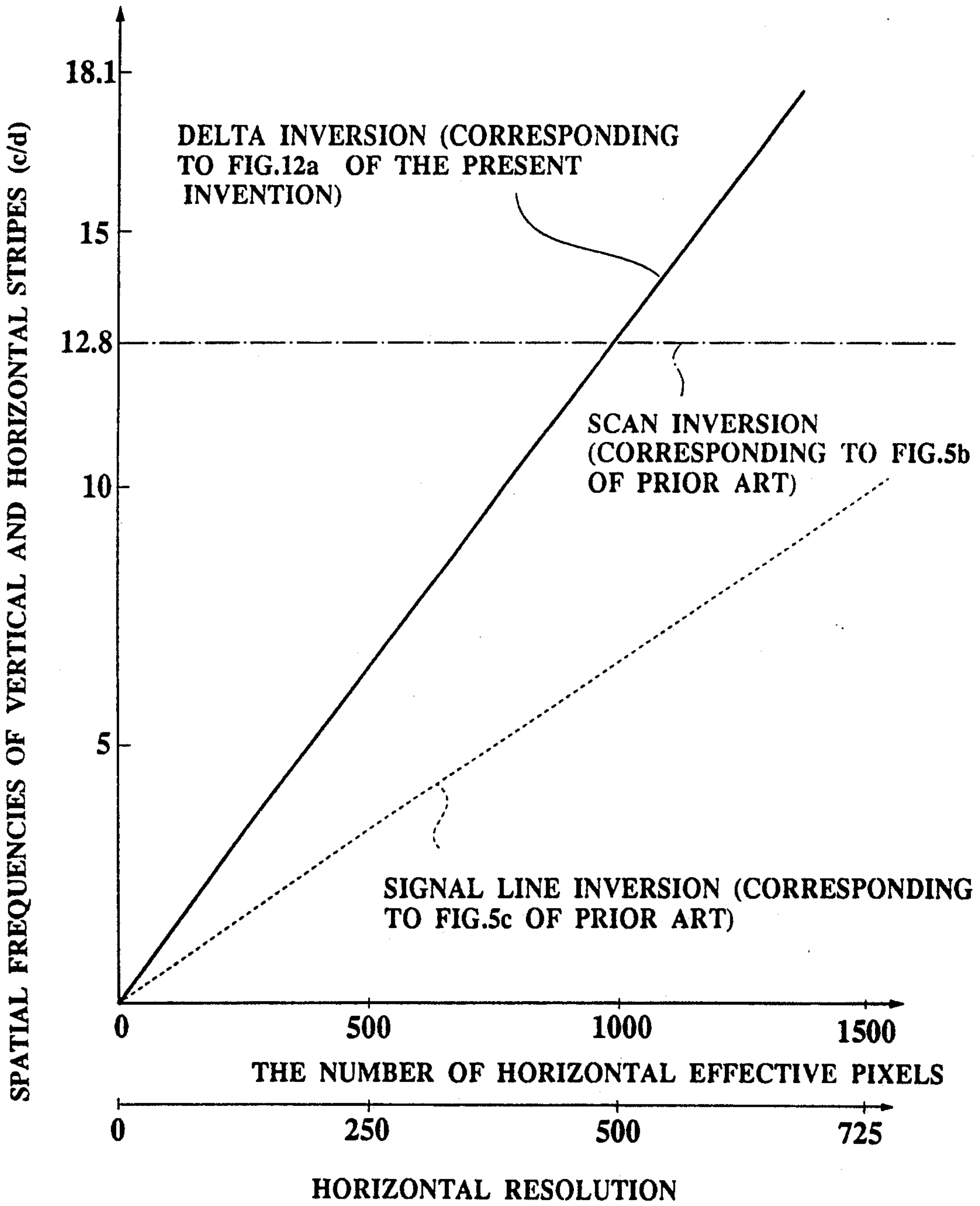
FIG. 10 is a view showing a relation of the number of horizontal pixels to the spatial frequencies of horizontal and vertical stripes, for explaining an LCD driving method according to a second embodiment of the present invention.

Supposing NV=488, then NLN=12.8[C/d]where $N_V$=the number of vertical lines $N_{LN}$=spatial frequency of horizontal stripes For the column inversion driving method, the following is established:

$$\tan 1^{\circ} = \frac{\left(\frac{\frac{4}{3} H}{N_H \cdot 2/3}\right) \times N_{SN}}{3H}$$

$$N_{SN} = \frac{3}{8} N_H \tan 1^{\circ} \ [c/d] \qquad (3-2)$$

where $N_H$=the number of horizontal pixels $N_{SN}$=spatial frequency of vertical stripes From the equations (3-1) and (3-2), a relation of the number of pixels to the spatial frequencies of vertical and horizontal stripes shown in FIG. 10 is obtained.

Since human eyes are most sensitive to green (G), the vertical and horizontal stripes are observed at the pitches shown in FIG. 10 depending on the driving methods. This fact has been confirmed through experiments.

Figure 11A:
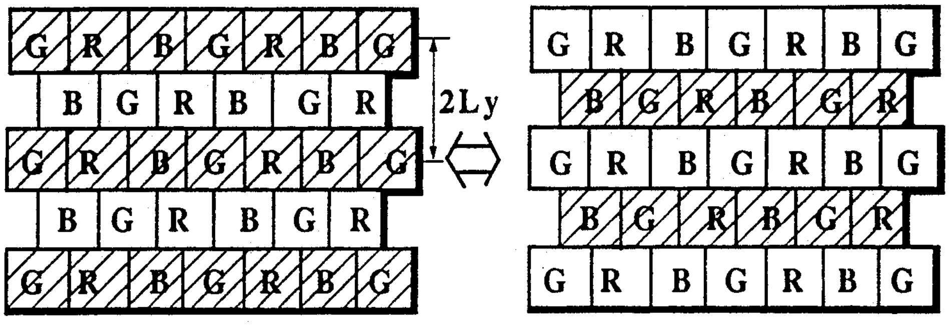
FIG.11a PRIOR ART
FIGS. 11*a* to 11*c* are views showing vertical and horizontal stripes occurring in respective driving methods.
Figure 11B:
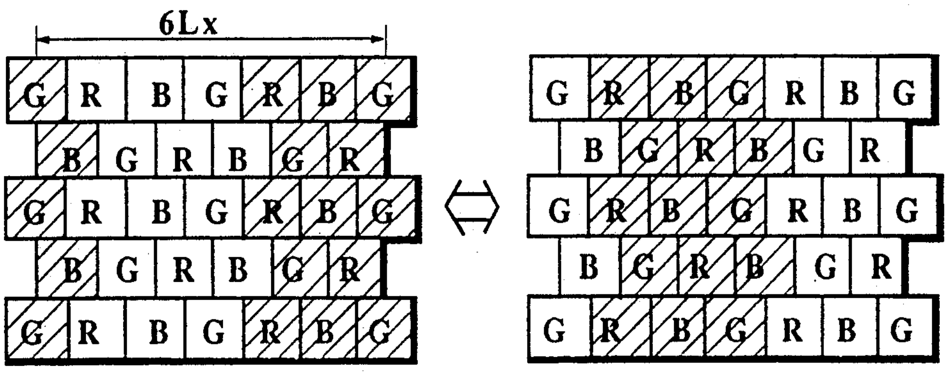

Compared to the scan line inversion driving method of FIG. 11*a* , the column inversion driving method of FIG. 11*b* produces more visible vertical stripes having a large pitch. This is because every second G pixel is inverted to form a redundant pitch. To deal with this, a half pitch inversion method shown in FIG. 11*c* can reduce the visibility of the vertical stripes, and provides high quality images compared to the line inversion driving method.

Figure 11C:
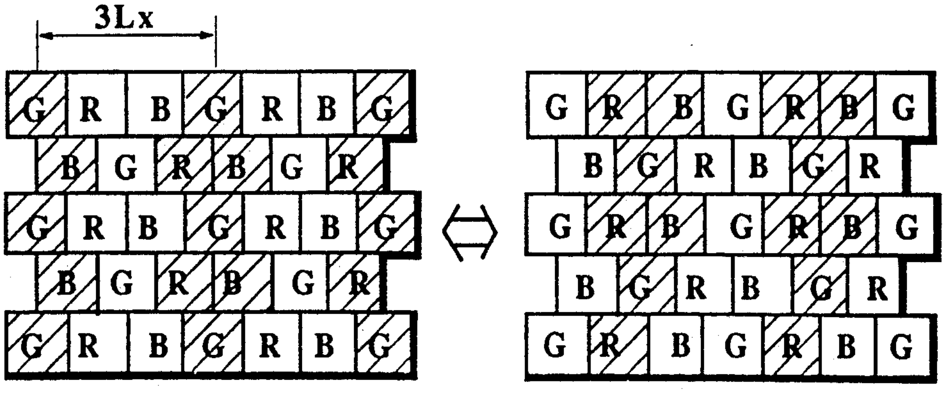
Figure 12A:
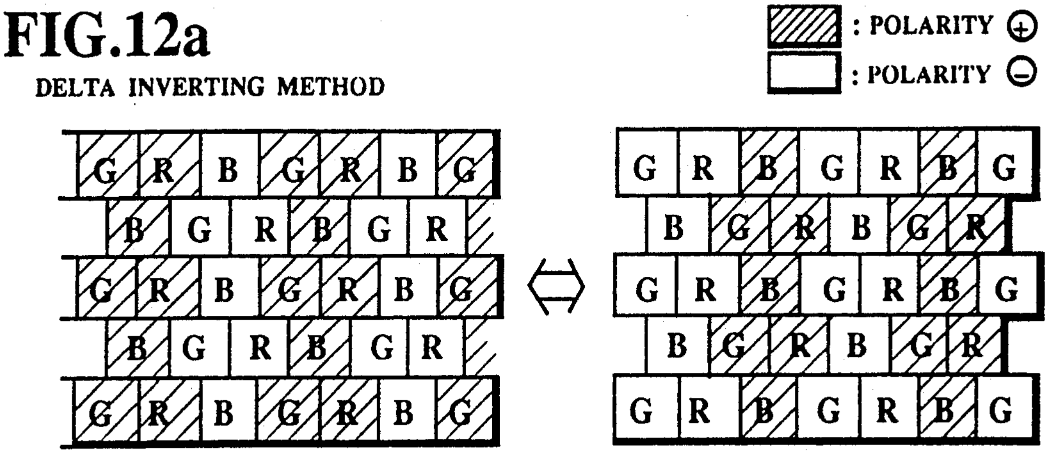
FIGS. 12*a* to 12*c* are views showing the LCD driving method according to the second embodiment of the present invention.

The method of FIG. 11*c* is realized in a manner shown in FIG. 12*a*. In FIG. 12*a*, color filters G, R and B are arranged in a Δ (delta) shape with a shift of ½ pitches between adjacent lines. Since the color filters R, G and B are arranged in the delta shape with inverted polarities, this method is called a delta inversion driving method.

A spatial frequency $N_{DN}$ of vertical stripes in the delta inversion driving method is expressed as follows:

$$N_{DN} = \tfrac{3}{4} N_H \tan 1^{\circ} [c/d] = 2N_{SN}$$

Since a pixel pitch Ly of the vertical stripes is narrow, and in addition, the vertical stripes are nested, 10, with a horizontal resolution and the number of they are not visible. Further, as is apparent from FIG. effective horizontal pixels increase, the spatial frequencies of the vertical stripes increase, so that the vertical stripes may be more invisible. In recent years, the horizontal resolution and the number of horizontal pixels are increasing, so that the present invention will be more useful.

Figure 12B:
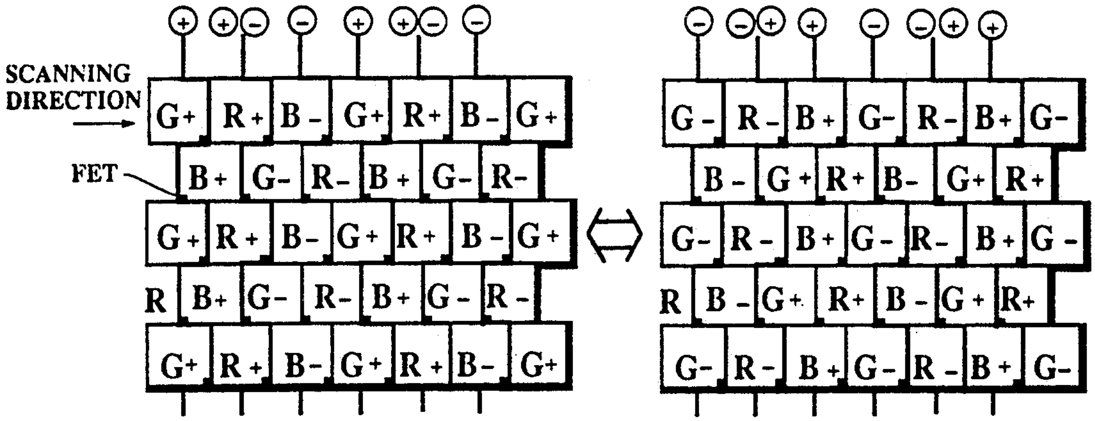
Figure 12C:
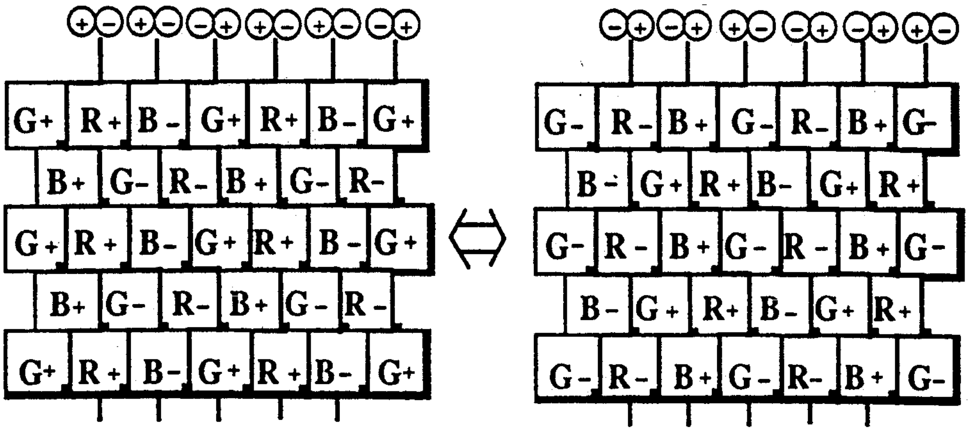
Figure 13A:
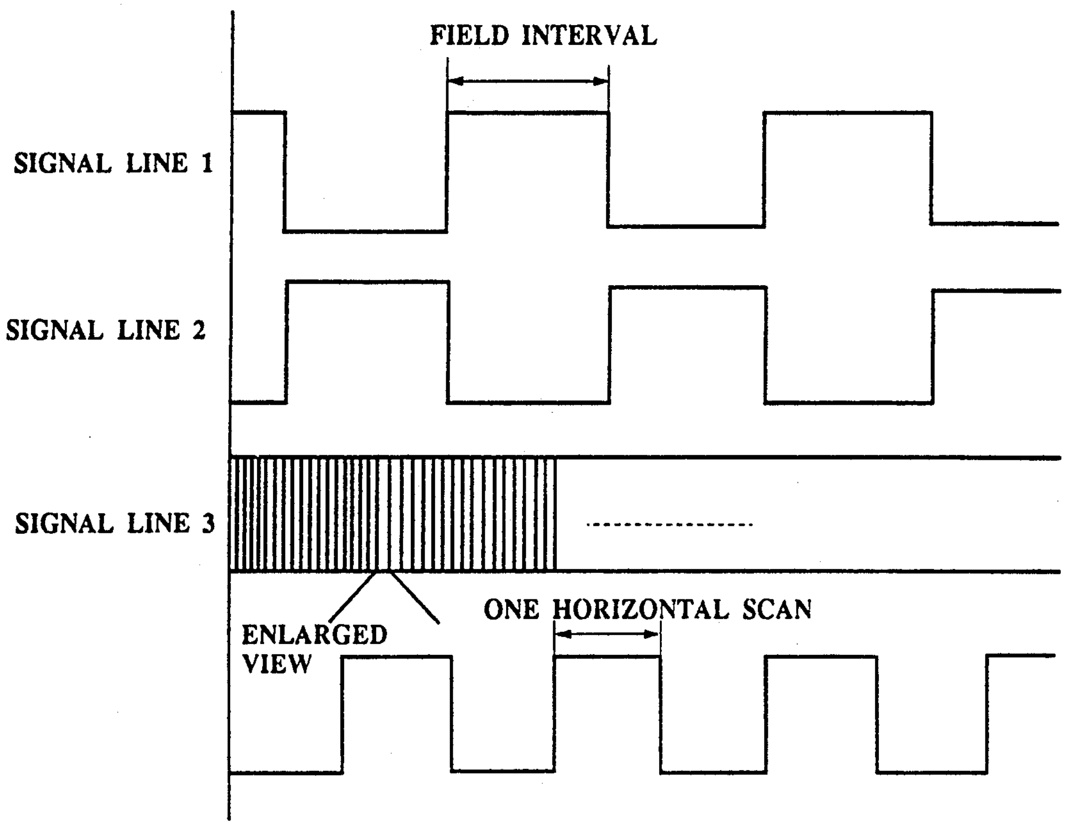
FIGS. 13*a* and 13*b* are views showing waveforms of signals applied to pixels through signal lines according to the embodiment of FIGS. 12*a* to 12*c*.

The delta inversion driving method with color filters being arranged in a delta may be realized in two ways as shown in FIGS. 12*b* and 12*c* depending on a way of connection of signal lines. In FIG. 12*b*, different color pixels are connected to the same signal line, so that the color pixels may be classified, depending on their signal lines, into those whose polarities are changed for every scan line and those whose polarities are changed for each field. In the latter color pixels, there are some whose phases differ from those of the others by 180 degrees. Consequently, there are three kinds of driving states in one frame. Driving waveforms of the method of FIG. 12*b* are shown in FIG. 13*a*.

Figure 13B:
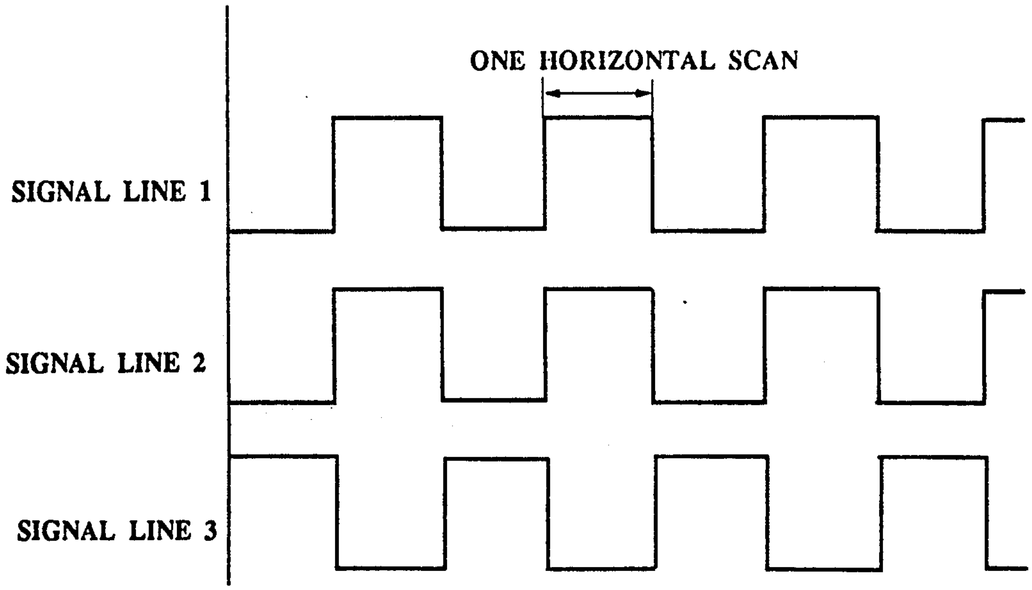

In FIG. 12*c*, one signal line is connected to the same kind of color pixels. In this case, the phase of one color signal among three color signals must be shifted by 180 degrees from those of the remaining two, in inverting their polarities for each scan line. Driving waveform of the method of FIG. 12*c* are shown in FIG. 13*b*.

In summary, the present invention can reduce flickers and make vertical stripes invisible, thereby providing high quality images on an LCD. In addition, the present invention can narrow pitches of vertical and horizontal stripes occurring in a frame to make them invisible and reduce flickers.

Various modifications will become possible for those skilled in the art after receiving the teachings of the present disclosure without departing from the scope thereof.

What is claimed is:

1. A method of driving a liquid crystal display, said liquid crystal display including a plurality of scan electrodes extending in parallel along a row direction; a plurality of signal electrodes extending in parallel along a column direction perpendicular to said row direction; a plurality of pixels arranged at intersections of said scan and signal electrodes in a matrix and connected to said scan and signal electrodes to operate in accordance with signals supplied therefrom, said pixels being allotted respectively three primary colors for color display such that each one of said colors repeatedly appears with the other two colors in between in a fixed order along each row, each pixel of one of said colors along one scan electrode being located, with respect to said row direction, between pixels of other colors along an adjacent row; a scan electrode driving circuit connected to said scan electrodes for scanning and activating said scan electrodes in sequence; a signal electrode driving circuit for sequentially supplying data signals to said pixels indicative of image data to be displayed through said signal electrodes, along one of said scan electrodes being activated by said scan electrode driving circuit; said method of driving said liquid crystal display comprising the following steps:

scanning said rows of said pixels connected to said scan electrodes by activating one of said scan electrodes in sequence; and supplying data signals indicative of said image data through said signal lines in synchronism with said scanning, wherein the polarity of data signals supplied to said pixels allotted to one of said colors along one row is opposite to the polarity of the other two colors along the same row, and wherein the polarity of said pixels of each color along one row is opposite to that along an adjacent row.

2. A method as set forth in claim 1, wherein said primary colors include green, red and blue and said data signals are supplied to pixels allotted to blue and red in phase.

3. A method as set forth in claim 2, wherein each of said signal electrodes is connected only to pixels allotted to one of said colors; and the polarity of said data signals is inverted when a scan electrode activated by one of said scan electrodes is changed.

4. A method as set forth in claim 2, wherein said signal; electrodes include first electrodes each of which is connected to pixels allotted to said one color and one of said two colors in turn, second electrodes each of which is connected to pixels allotted to said one color and the other of said two colors in turn, and third electrodes each of which is connected to pixels allotted to said two colors in turn; the polarity of data signals supplied through each of said first and second electrodes is maintained during scanning of rows; and the polarity of data signals supplied through said third electrodes is inverted when a scan electrode activated by one of said scan electrodes is changed.

5. A method as set forth in claim 4, wherein the polarity of data signals supplied through each of said first and second electrodes is inverted after complete scanning of said rows.

* * * * *